United States Patent [19]

Gallagher et al.

[11] Patent Number: 4,733,397
[45] Date of Patent: Mar. 22, 1988

[54] RESONANT CAVITY OPTICAL MODULATOR

[75] Inventors: Thomas F. Gallagher, Charlottesville, Va.; John P. Watjen, Sunnyvale, Calif.

[73] Assignee: Electrical Power Research Institute, Inc., Palo Alto, Calif.

[21] Appl. No.: 765,039

[22] Filed: Aug. 12, 1985

[51] Int. Cl.$^4$ ............................................... H01S 3/10
[52] U.S. Cl. .......................................... 372/26; 372/28
[58] Field of Search ............................. 372/13, 26, 28

[56] References Cited

U.S. PATENT DOCUMENTS 3,958,863  5/1976  Isaacs et al. ............................ 372/13
3,977,770  8/1976  Isaacs et al. ............................ 372/13

OTHER PUBLICATIONS

Tran et al., "Frequency-Modulation Spectroscopy with a Pulsed Dye Laser: Experimental Investigations of Sensitivity and Useful Features" Applied Optics 23, May 9, 1984, pp. 1353–1360.

Primary Examiner—Gene Wan
Attorney, Agent, or Firm—Flehr, Hohbach, Test, Albritton & Herbert

[57] ABSTRACT

A phase-matched resonant waveguide modulator suitable for very high frequency modulation and applications such as FM laser spectroscopy is described. The width of a crystal modulator section of the waveguide is chosen so that the operating frequency is just above cut-off to achieve optical and RF phase velocity matching at high frequencies such as 10 GHz by virtue of the dispersion of the waveguide near cut-off. The waveguide contains air in opposite end sections so that those sections are below cut-off and the microwave is evanescent, with the result that the end sections preferably are open for ease of optical coupling to the waveguide.

18 Claims, 3 Drawing Figures

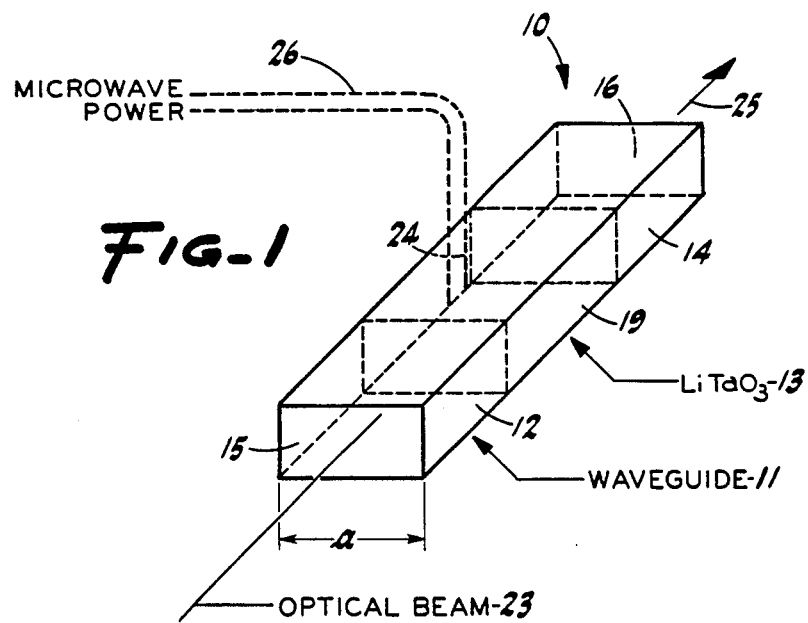
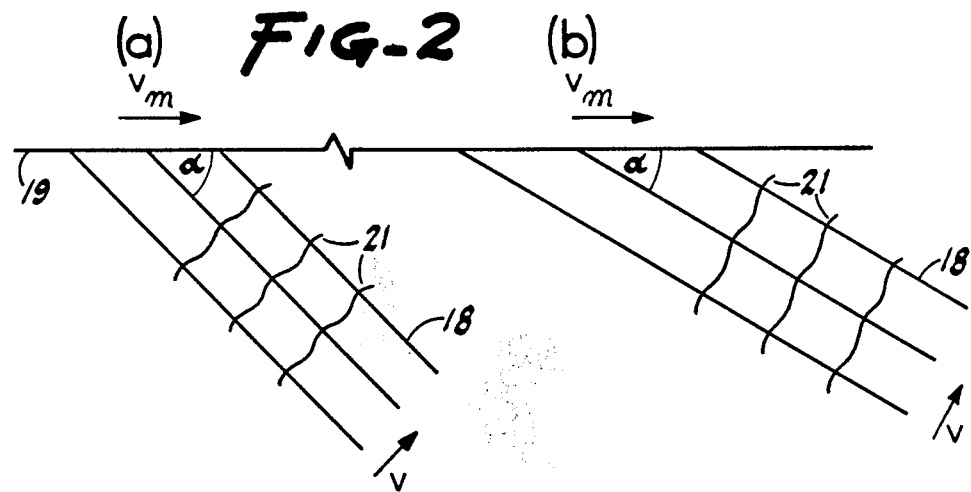

RESONANT CAVITY OPTICAL MODULATOR

BACKGROUND OF THE INVENTION

The present invention relates to a device which is used to frequency modulate a laser beam. The present invention also relates to the use of this frequency modulator in various fields, such as, in FM (frequency modulation) laser spectroscopy for the detection of small absorptions and dispersions such as those of trace constituents in the atmosphere, and in optical communication systems.

Considering now one of the primary applications of the invention, that is, FM laser spectroscopy, that technique was introduced by Bjorklund, *Optics Letters* 5 15, 1980. Bjorklund used a single frequency continuous wave (CW) dye laser to provide a monochromatic laser beam, which was passed through a high frequency modulator to produce upper and lower sidebands, then was passed through an absorption cell containing the trace constituents in order to monitor the difference in absorption of the upper and lower sidebands. It is believed that this technique has been used to observe absorptions of trace elements as small as $10^{-4}$ using a one-milliwatt laser.

To review the general aspects of FM laser spectroscopy, consider first an unmodulated, monochromatic beam of light such as a laser beam, having a characteristic frequency, $\nu_o$. If the beam is passed through an electro-optic (EO) phase modulator in the form of a nonlinear crystal which is driven at the radio frequency $\nu_m$, the light beam emerges from the phase modulator with two sidebands of frequencies which are, respectively, the sum and difference frequencies of $\nu_o \pm \nu_m$.

If the modulated beam impinges on a square law detector, such as a photodiode, the photocurrent produced has a dc component which is proportional to the sum of the intensities in the carrier and in the two sidebands at $\nu_o \pm \nu_m$. In addition, beat signals arise at $\nu_m$ due to the beating of each of the two sidebands with the carrier. The two sidebands are phase-related, because they are produced in the same electro-optic phase modulator. The cyclical beat signals at the sideband frequency $\nu_m$ from each of the two sidebands and carrier are equal and opposite in phase and, thus, cancel, so that the sideband photocurrents contain no ac component at $\nu_m$.

If an absorbing gas is placed between the modulator and detector, the gas partially absorbs one of the beat note signals and, as a consequence, the beat notes do not completely cancel and the total signal includes a component from the unabsorbed sideband at frequency $\nu_m$.

From the above, it is clear that the FM modulated laser approach is essentially a balanced bridge approach in which the two beat signals cancel to zero if there is no absorption between the modulator and the detector. The FM modulated laser approach is a potentially very sensitive technique, because it is limited only by the shot noise in the sideband frequencies. For example, for a one milliwatt laser with ten percent of the power in the sideband frequencies, the shot noise limit is an absorption of $10^{-6}$. In addition, an ac photocurrent component arises at frequency $\nu_m$ whenever there is a difference in the absorption of the two sidebands. Thus, the technique is inherently a phase-sensitive differential absorption technique which uses only one optical beam.

As discussed in the above-cited Bjorklund article, FM spectroscopy was first realized using a single frequency continuous wave dye laser system 22 operating near 6,000 Angstroms. The laser bandwidth was less than 10 MHz, and the modulation frequency $\nu_m$ was 900 MHz. Since the 10 MHz bandwidth of the laser was so much less than the 900 MHz modulation frequency, it was, for all practical purposes, monochromatic. However, sensitivity to absorptions as small as about $10^{-4}$ was observed; this limit was attributed to a small amount of amplitude modulation of the dye laser beam by the system phase modulator, which converted the one percent amplitude noise of the laser to a detectable signal at $\nu_m$.

Although this single frequency dye laser system has a number of nearly ideal characteristics it also has several severe limitations. First, it is difficult to maintain the alignment of such lasers. This would be a severe shortcoming in any field application. Secondly, the wavelength range for which dye lifetimes are measured in days instead of hours is very limited, effectively covering the range of about 5500-7000 Angstroms. Furthermore, due to the low power of continuous wave lasers, it is not realistic to expect to extend the wavelength range of a CW laser using nonlinear optics.

In contrast to continuous wave lasers, pulsed dye lasers do not suffer from the above shortcomings and, thus, on this basis would seem to have excellent potential for application to FM spectroscopy. That is, pulsed dye lasers are simple to operate and have been used in various environments with relative ease in maintaining alignment. In addition, the wavelength range of pulsed dye lasers covers the entire range of 3500-10,000 Angstroms. Furthermore, the high power of pulsed dye lasers relaxes the detector sensitivity requirements and would allow the use of nonlinear optics to extend the wavelength range into the ultraviolet and infrared spectral regions. Pulsed dye lasers are also intrinsically very fast, that is, five ns (nanoseconds) pulse durations are typical, which allows high temporal and in some cases high spatial resolution.

Unfortunately, the sensitivity of the FM spectroscopy method depends upon two conditions which have constrained the use of pulse dye lasers. First, the laser line width must be much less than the modulation frequency to avoid the inherent noises of the laser. Second, the absorption features must be narrower than the modulation frequency; otherwise both sidebands are absorbed and the differential absorption is diminished. Both conditions or problems would be obviated by the availability of high frequency modulators. However, the available modulators have operating frequencies of less than 1 GHz. As a consequence, it is not possible to sensitively detect atmospheric pressure broadened features which are several GHz wide, nor is it possible to use any type of laser other than a single frequency cw laser.

Thus, having a high frequency (~8–10 GHz) modulator would make it possible to develop FM spectroscopy into a much more useful and versatile tool. For example, the pressure broadened spectral features which are found in combustion and atmospheric diagnostics may be monitored if a high frequency modulator is employed. Similarly, the use of a high frequency modulator allows the use of more broadband lasers such as multi-mode cw lasers and pulsed lasers. These lasers are both more portable, allowing field applications, and have wider spectral coverage. The pulsed laser in addition allows the observation of transient absorptions on time scales as fast as 5 ns (nanoseconds) and can be extended into the ultraviolet and infrared using nonlinear optical techniques.

Just as present day radio broadcasts are made using amplitude or frequency modulated radio waves, so may information be transmitted on frequency or amplitude modulated optical waves. The ability to modulate an optical beam at a high frequency is clearly desirable for optical communications applications, as well as spectroscopy applications.

In short, a high frequency modulator is crucial if a pulsed laser is to be used in FM laser spectroscopy applications, both to obtain maximum absorption sensitivity for narrow absorption features and also to observe broad spectral features such as pressure broadened atomic or molecular lines. Furthermore, regardless of the application of the modulator, to be at all practical, a high frequency (10 GHz) modulator must be capable of putting 10 percent of the laser power into each sideband with, for example, 10 watts of microwave drive power. Unfortunately, the requirement of phase matching makes it difficult to fabricate a 1 GHz modulator, let alone a 10 GHz modulator.

To review phase matching, it is useful to briefly review the basics of electro-optic (EO) modulators. As mentioned above, these devices use the EO effect. In an EO crystal, such as $LiTaO_3$, the change, $\Delta n$, in the optical index of refraction, n, is proportional to the electric field applied to the crystal. That is, $\Delta n \propto E$, where E is the electric field. In traversing through a crystal of length l, an optical beam accumulates a phase change, relative to the phase for E=0, given by $\Delta\phi \propto El$, which is proportional to the length of the crystal. For a crystal such as $LiTaO_3$, a practical length of the modulator crystal is 2 centimeters or one wavelength of the modulating frequency for modulating fields of 1 GHz. A 2 cm crystal length is then 10 wavelengths of the modulating frequency for a modulating field of 10 GHz.

The problem of phase matching at such high modulation frequencies stems from the fact that for efficient modulation the optical wave must stay in phase with the modulating wave. Unfortunately, in the exemplary $LiTaO_3$ crystal, the optical wave propagation velocity, $v_o$, and the modulating radio frequency wave propagation velocity, $v_m$, differ by a factor of 3: $v_o/v_m = (c/n_o)/(c/n_m) = 6.56/2.18 \approx 3$. This difference in the propagation velocity of the optical and modulating waves in the very long modulator crystal results in the optical wave being in phase with the modulator wave only periodically. In fact, the time the optical wave spends in phase with the negative segment of the modulating wave tends to cancel any modulation produced by the positive segment of the modulating wave. As a consequence, the modulating efficiency of such a high frequency system tends to be very low.

Two modulator designs have been proposed previously for optical and RF phase velocity matching. The first approach involves the use of mirrors to impart a zigzag path to the optical beam to decrease its velocity across the crystal modulator. The second approach uses a waveguide in the form of a partially filled transmission line, that is, a waveguide which is partially crystal and partially filled with a faster propagation medium such as air (for which $n_m = 1$) to increase the propagation velocity of the microwave across the crystal modulator. As a result, the velocity of the microwave falls between its velocity in the bulk crystal and its faster velocity in air and the microwave can be matched to the optical wave velocity by selecting the ratio of the microwave path length in the air and in the crystal. This second approach is useful only for modulation frequencies of up to about 3 GHz. In fact, both approaches use low modulation frequencies and are very inconvenient to use.

SUMMARY OF THE INVENTION

In view of the above discussion, it is one object of the present invention to provide an efficient, very high frequency modulator of monochromatic light.

It is another object to provide a phase-matched resonant element for the efficient high frequency modulation of pulsed laser light.

It is another object of the present invention to provide an efficient, powerful modulator for high frequency pulsed laser spectroscopy applications and other high frequency applications.

It is still another object of the present invention to provide an efficient powerful modulator for high frequency optical communications applications.

These and other objects of the invention are provided in a resonant cavity that incorporates a crystal modulator element with air at both ends and uses the dispersion of waveguides near cut-off to provide optical and RF phase velocity matching at high frequencies, such as 10 GHz and above. The phase matching permits the use of an efficient, resonant crystal whose length, l, is very nearly an integral number of half-wavelengths, $\lambda_m/2$ (there is a small correction due to end effects). Also, as the result of phase matching using a crystal having a relatively large index of refraction, $n_m$, for the microwave, compared to $n_m = 1$ in air, the microwave frequency in the air sections is far below cut-off at the operating frequency. As a consequence, the wave is evanescent and the preferred waveguide construction is devoid of end walls to permit ease of optical transmission through the cavity.

In one particular aspect, the present invention relates to an RF laser modulator constructed of a waveguide having a crystal section and having a selected value of the operating frequency relative to the cut-off frequency to provide very high frequency optical and microwave velocity phase matching. The waveguide dimensions can then be tailored to provide the above-mentioned resonant operation, and evanescent operation.

In another specific aspect, the present invention relates to an RF laser modulator comprising an open-ended metal waveguide for efficiently transmitting a pulsed monochromatic optical beam such as a laser beam therethrough; and a modulator material in the form of a $LiTaO_3$ crystal occupying a center section of the waveguide of length, l, for transmitting the optical beam therethrough at a phase velocity $c/n_o$, where c is the speed of light and $n_o$ is the optical index of refraction of the beam in the transmitting medium. The opposite end sections of the waveguide adjacent the open waveguide ends comprise a gaseous ambient such as air; and the width, a, of the crystal modulator material is selected so that the dispersion of the waveguide near the cut-off frequency, $f_c$, provides a microwave phase velocity, $(c/n_m)/(1-(f_c/f)^2)^{\frac{1}{2}}$, which approximately equals the optical phase velocity $c/n_o$, where $n_m$ is the microwave index of refraction in the crystal modulator material, f is a selected operating frequency, and the cut-off frequency, $f_c$, is $c/(2n_m a)$.

BRIEF DESCRIPTION OF THE DRAWINGS

The above and other aspects of the invention are described in detail referring to the drawings, in which:

FIG. 1 is a schematic representation of a LiTaO$_3$ resonant cavity optical modulator which is constructed in accordance with the present invention;

FIG. 2 is a simplified schematic illustration of the effect of the angular orientation of waves relative to a waveguide surface on microwave phase velocity as the microwave cut-off frequency is approached.

DETAILED DESCRIPTION OF THE INVENTION

The Optical Modulator

Figure 3:
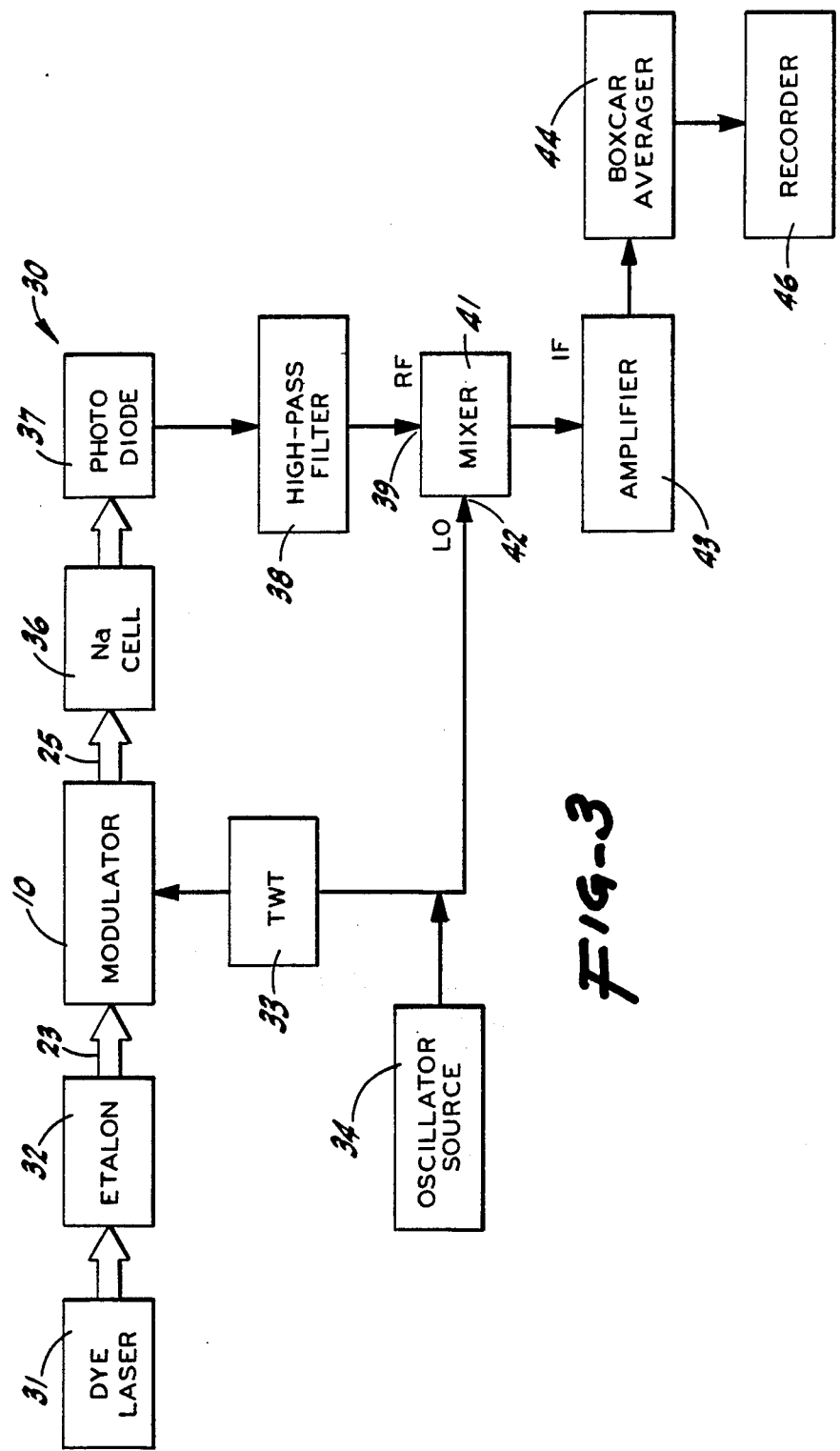
FIG. 3 is a block diagram of a pulsed laser FM spectroscopy system which uses the LiTaO$_3$ FM optical modulator of FIG. 8.

FIG. 1 is a schematic perspective view of a preferred embodiment 10 of the resonant cavity optical modulator of the present invention. The construction of the resonant cavity optical modulator 10 satisfies all of the criteria discussed previously in that it is an efficient, high-power, phase matched, high frequency laser modulator, yet is a structurally relatively simple, elegant solution to the difficulties involved in achieving the desired combination of characteristics.

Referring further to FIG. 1, the resonant cavity optical modulator 10 comprises a rectangular waveguide cavity 11 of metal, such as copper, having air-filled waveguide sections 12 and 14 at either end and a center section 13 filled with a crystal such as LiTaO$_3$. The waveguide ends 15 and 16 are open. As discussed below, this construction utilizes the variation in the microwave velocity and cut-off frequency associated with variation in the angles of the wave fronts relative to the sides of the waveguide cavity to provide a resonant, phase-matched waveguide modulator.

The novel cut-off frequency approach employed in the optical modulator 10 involves using the dispersive properties of waveguides just above the cut-off frequency to achieve phase matching. For any waveguide filled with a crystal such as, for example, LiTaO$_3$, the velocity of the optical beam is $c/n_o$, but the phase velocity of the microwave varies from $c/n_m$ to infinity as the microwave frequency is reduced toward the cut-off frequency. The cut-off frequency is simply that frequency for which the wavelength in the bulk material such as LiTaO$_3$ is equal to twice the width of the waveguide. Wavelengths longer than the cutoff wavelengths are too long to propagate through the waveguide. This assumes the use of a rectangular waveguide which is wider than it is high, and that the microwaves are polarized vertically.

The concept of phase velocity is illustrated in FIG. 2 for a group of microwaves 18—18 propagating at an angle along a boundary such as the interior surface 19 of the waveguide 11. The phase velocity, $v_m$, along the surface 19 is simply the velocity at which the crests 21—21 of the individual waves 18 move along the surface 19. If the wave velocity vector v is at an angle, $\alpha$, such as 45° to the surface 19, as shown in FIG. 2A, then the phase velocity $v_m$ is larger than the microwave velocity v.

In the event the wave front is rotated so that the angle $\alpha$ at which the waves 18—18 approach the surface 19 is a more shallow angle, as shown in FIG. 2B, the phase velocity $v_m$ increases. In a waveguide, as the frequency is reduced toward the cut-off frequency at which the wavelength in the bulk material is equal to twice the width of the waveguide, the microwave propagates more and more across the guide corresponding to the waves approaching the surface 19 at 90°. As a consequence, the phase velocity along the guide tends to increase more rapidly, ultimately to infinity.

This characteristic increase in phase velocity $v_m$ as the microwave frequency is reduced toward the cut-off frequency is used in the present invention by selecting the desired operating frequency and choosing the cavity width, a, so that the selected operating frequency is just above the cut-off frequency to match the microwave propagation velocity to the optical phase velocity $v_o$.

Typically, the microwave phase velocity, $v_m$, in a crystal modulator such as 10 is lower than the laser or optical phase velocity, $v_o$, in the crystal:

$$c/n_m = v_m \leq v_o = c/n_o, \tag{1}$$

where
  c = the velocity of light,
  $n_m$ = the microwave index of refraction, and
  $n_o$ = the optical index of refraction.

Near the cut-off frequency, $f_c$, the microwave phase velocity, $v_m$, is approximated by $$(c/n_m)/(1-(f_c/f)^2)^{\frac{1}{2}}, \tag{2}$$

where
  f = the operating frequency, $$f_c = c/(2n_m a), \text{ and} \tag{3}$$

$$a = \text{the width of the crystal modulator}, \tag{4}$$
$$= c/(2n_m f_c).$$

Thus, phase velocity matching requires that $$(c/n_o) = (c/n_m)/(1-(f_c/f)^2)^{\frac{1}{2}}, \text{ or} \tag{5}$$

$$n_m/n_o = (1-(f_c/f)^2)^{-\frac{1}{2}}. \tag{6}$$

For an exemplary LiTaO$_3$ (lithium tantalate) crystal modulator material, $n_o = 2.18$ and $n_m = 6.56$ in the crystal. From (6), phase matching thus requires that $(1-(f_c/f)^2)^{-\frac{1}{2}} = n_m/n_o \approx 3.09$, i.e., that $f/f_c \approx 1.06$. The cavity width, a, which provides the required phase matching cut-off frequency, $f_c$, is then obtained from equation (4) as $a = 1.06c/(2n_m f)$.

In short, the phase matching for the exemplary LiTaO$_3$ crystal or other modulator crystals uses the dispersion characteristics of the crystal modulator near cut-off. The phase matching cavity width is proportional to the cut-off frequency of the crystal modulator section 13, FIG. 1, for the selected operating frequency, (equation (4)) and the proportionality factor is obtained by the relationship $f_c/f$ from equation (6). For the phase matched condition $v_m \approx c/n_o$; $v_m \approx c/(fn_o)$.

As shown above, in LiTaO$_3$, the phase matching operating frequency, f, is six percent higher than the cut-off frequency and, in LiTaO$_3$ as well as in other modulator crystals, the relative frequencies f and $f_c$ are fixed, indepedent of the size of the rectangular waveguide. As a consequence, not only can phase matching be implemented by the proper choice of the operating frequency but, in addition, the length of the crystal modulator section 13 can be selected to provide resonant operation, in order to optimize the efficiency of the microwave power without altering phase matching. That is, if the crystal 13 is made an integral number of microwave half-wavelengths $\lambda_m$ (with an approximately 30 percent of a half wavelength correction for the ends), the crystal becomes a microwave resonator.

Because the LiTaO$_3$ crystal used in the crystal modulator section 13 has such a large index of refraction for microwaves ($n_m = 6.56$), the cutoff frequency for the waveguide 10 is 6.56 times higher in the air sections 12 and 14 than in the LiTaO$_3$ crystal modulator section 13. Thus, in the air filled sections 12 and 14, the microwaves are evanescent—the microwaves cannot propagate away from the LiTaO$_3$ section 13. The effect on the microwaves is quite similar to having waveguide end walls. This lack of need of physical end walls permits the use of open ends 12 and 14, which makes it very easy to couple the optical beam 23 through the modulator 10.

Those of skill in the art will appreciate that crystals other than LiTaO$_3$ can be used as the very high frequency modulator section 13 with similar results using different operating frequencies obtained as described above. Examples of alternative crystal materials are LiNbO$_3$ and KDP (potassium dihydrogen phosphate).

Referring further to FIG. 1, the phase matching and resonance principles described above were used to produce a resonant cavity optical modulator 10 which measured 1×3×40 millimeters and an LiTaO$_3$ crystal section 13 which measured 1×2.87×25 millimeters. The crystal's top and sides were chromium and copper flashed and then copper plated. The ends were left unplated where the optical beam passes. In addition, an unplated vertical stripe was left on one side, at 24, for the coupling of microwave energy from the exciting probe (not shown). Microwave energy from a standard source (not shown) was applied via transmission line 26 and coupled magnetically to the crystal cavity 11 from the point on a probe which was one-quarter wavelength from its end. It was expected that this construction would provide a cut-off frequency of 7.98 GHz, a microwave resonance operating frequency of 8.36 GHz with a Q of 100, and a very high sideband intensity, that is, first sideband intensities of about 7 percent of the carrier intensity with 1 watt of drive power. This corresponds to a modulation index of 0.57. In practice, resonance occurred at 8.41 GHz with a Q of 100, and the microwave power input of 1 watt provided sidebands having an intensity of 7 percent of the carrier intensity as expected.

APPLICATIONS

1. FM Laser Spectroscopy

FIG. 3 is a block diagram of the basic elements of the type of system 30 which was used to investigate a number of applications of the modulator system 10 of FIG. 1. In one embodiment, this system 30 utilizes a tunable dye laser system 31 comprising a Nd:YAG laser system which provides a laser beam at 1.06 microns which is frequency doubled to 5320 Angstroms and is used to pump a pressure-tuned dye laser. The Nd:YAG laser runs at a 10 Hz repetition rate and the resulting dye laser produces five nanosecond long pulses at typical line widths of 3 GHz, which may be narrowed to less than 2 GHz using an optional external etalon 32. The resulting dye laser beam 23 traverses the modulator 10, FIG. 1, which is FM modulated by a traveling wave tube amplifier 33, which, in turn is driven by high frequency oscillator 34 so that the resulting beam 25 acquires sidebands. The modulated beam 25 traverses a conventional absorption cell 36, such as, for example, a sodium cell, then impinges on a photodiode 37 such as, for example, the Hewlett Packard Corporation fast photodiode which is described in Wang et al, "20-GHz Bandwidth Ga As Photodiode", *Appl. Phys. Lett.*, 42, 2, Jan. 1983, pp 190–193. In turn, the electrical output signal from the photodiode 37 is applied to a high pass filter 38 to filter out signals except at the modulating frequency and then to the radio frequency port 39 of a double balanced mixer 41 which demodulates the photocurrent signal at the modulation frequency due to absorption. Local oscillator port 42 of the mixer 41 is driven by the same oscillator 34 that drives the modulator 10. The amplified output of the mixer 41 is applied to a gated integrator or boxcar averager 44. The boxcar averager 44 stretches the five nanosecond signal and applies the stretched signal to a conventional strip chart recorder 46.

The modulator 10 described above has been used in embodiments of the FM spectroscopy system 30 to perform a variety of FM spectroscopy experiments, all employing lasers other than a single mode cw laser. It has been used at modulation frequencies of 8–16 GHz, in combination with a tunable pulsed dye laser of 5 ns pulse duration and ~2–3 GHz linewidth. It produced modulated laser beams with 15% of the laser energy in each of the upper and lower sidebands with 10 W of microwave drive power. The system was used to observe both atmospherically broadened absorptions and transient absorptions in the visible spectral range. Furthermore, the high power of the pulsed laser (1 kwatt) has made it possible to frequency double a visible dye laser beam to the ultraviolet and observe absorption in that spectral range. Using this modulator FM spectroscopy has also been demonstrated with a multi-mode cw dye laser, which would not have been possible using a conventional modulator. The above, and other, FM spectroscopy applications and investigations are disclosed in Tran et al, "Frequency-Modulation Spectroscopy with a Pulsed Dye Laser: Experimental Investigations of Sensitivity and Useful Features", *Applied Optics*, 23, 9, May, 1984, pp 1353–1360. The Tran et al paper is incorporated by reference.

While the principles and operable examples of the resonant cavity optical modulator of the present invention have been described above, those of usual skill in the art will readily advance the concept disclosed in ways which are within the scope of the present invention. For example, the exemplary modulator will be made more efficient in terms of microwave power consumption, for example, by using a longer cavity instead of the present 3$\lambda$/2 cavity, which would reduce the microwave power required to produce a given amount of energy in the sidebands. A second efficiency-improving modification involves passing the optical beam through the modulator several times, adding the modulation produced on successful passes. The simplest approach would be to simply retro-reflect the optical beam through the modulator, thus, lowering the required microwave power by a factor of 4. In principle, it is straightforward to reflect the beam through the modulator ten times, thus, reducing the microwave power required to produce the same modulation index by a factor of 100.

2. Amplitude Modulation

The modulator described here is a phase modulator, but it can easily be converted to an amplitude modulator in several ways. For example, placing polarizers in the optical beam before and after the modulator with their axes at angles from the direction of the microwave electric field direction in the LiTaO$_3$ produces amplitude modulation. If the angles of the two modulators are ±45, respectively, 100% amplitude modulation may be achieved.

An amplitude modulator would find spectroscopic application in the study of rapidly decaying species, such as molecules which have internal energy conversion. Briefly, one amplitude modulated laser may be used to introduce a time variation into the molecular population and a second modulated laser to interrogate the molecular population.

3. Communications

In communications applications, the resonant cavity modulators might find many applications. One obvious example of such an application is to make the transition from the present microwave transmission equipment to optical transmission. The microwave transmission is frequently over a small frequency range, and a resonant cavity modulator of the proper bandwidth could easily be used to directly convert a microwave transmission to an optical transmission.

It should be noted that the microwave bandwidth of the modulator is equal to the quotient f/Q where f is the operating frequency of the modulator and Q is its quality factor. For spectroscopic applications, it is desirable that Q be as large as possible, i.e., the inverse of the loss tangent of the crystal. However, for communications applications it may be desirable to lower the Q of the resonator or by, for example, overcoupling the feeding probe to the cavity. This will result in a larger microwave bandwidth but will require more microwave drive power.

Having thus described preferred and alternative embodiments of the present invention, what is claimed is:

1. A laser modulator comprising a waveguide for applying a selected high operating frequency modulating signal such as a radio frequency signal to a laser beam for frequency modulating the laser beam, and wherein the waveguide includes a crystal section having its width selected so that the high operating frequency is just above the cut-off frequency, whereby the associated phase velocity of the modulating signal in the crystal approximates the laser phase velocity in the crystal.

2. An RF laser modulator comprising a waveguide having a central crystal section along its length and wherein the width of the crystal is selected as $c/(2n_m f_c)$ to approximate the condition $(f_c/f) = (1-(n_o/n_m)^2)^{\frac{1}{2}}$ such that the microwave operating frequency is just above the cut-off frequency, to thereby establish high-frequency optical and microwave velocity phase matching, where c is the speed of light, f is the microwave operating frequency, $f_c$ is the microwave cut-off frequency, $n_o$ is the optical index of refraction of the laser beam in the crystal and $n_m$ is the microwave index of refraction in the crystal.

3. The RF laser modulator of claim 2, wherein the Q of the cavity is less than the inverse of the loss tangent of the crystal modulator material.

4. The RF laser modulator of claim 2, wherein the crystal length is selected to provide microwave resonance.

5. The RF laser modulator of claim 2, wherein the crystal length, l, is approximately equal to an integral number of microwave half-wavelengths, $\lambda_m/2$, where $\lambda_m$ is the microwave wavelength in the crystal, to provide microwave resonance.

6. The RF laser modulator of claim 2 or 4, wherein the waveguide dimensions are selected to provide evanescence in an air filled waveguide and the waveguide is devoid of endwalls, to facilitate transmitting the laser beam through the cavity.

7. The RF laser modulator of claim 6, wherein the modulating microwave is coupled to the waveguide by one of aperture coupling to the crystal or probe coupling to the evanescent region.

8. The RF laser modulator of claims 2 or 5, wherein the waveguide dimensions selected to provide phase matching also provide an operating frequency, f, of the waveguide near the cut-off frequency, $f_c$, for the microwave index of refraction in the crystal modulating material, $n_m$, so that the microwave is evanescent in an air filled waveguide and wherein the waveguide is devoid of endwalls to facilitate transmitting the laser beam through the cavity.

9. The RF laser modulator of claim 8, wherein the modulating microwave is coupled to the waveguide by one of aperture coupling to the crystal or probe coupling to the evanescent region.

10. The RF laser modulator of claims 9 or 8, wherein the modulating electromagnetic wave or microwave is coupled to the waveguide by one of aperture coupling to the crystal or probe coupling to the evanescent region.

11. A high frequency RF laser modulator comprising a metal waveguide having open opposite ends for efficiently transmitting a pulsed monochromatic optical beam such as a laser beam therethrough; a modulator material in the form of an LiTaO$_3$ crystal occupying a center section of the waveguide of length, $\lambda$, for transmitting the optical beam therethrough at a phase velocity $c/n_o$, where c is the speed of light and $n_o$ is the optical index of refraction of the beam in the transmitting medium; the opposite end sections adjacent the open waveguide ends comprising a gaseous ambient such as air; the width, a, of the crystal modulator material being selected so that the dispersion of the waveguide near the cut-off frequency, $f_c$, provides a microwave phase velocity, $(c/n_m)/(1-(f_c/f)^2)^{\frac{1}{2}}$, which approximately equals the optical phase velocity $c/n_o$, where $n_m$ is the microwave index of refraction in the crystal modulator material, f is the selected operating frequency, $f_c$ is the cut-off frequency, and a is given by $c/(2n_m f_c)$.

12. The RF laser modulator of claim 11, wherein the width, a, is chosen so that the microwave phase velocity equals the optical phase velocity in LiTaO$_3$, where $n_o \simeq 2.18$ $n_m \simeq 6.5$, and $f/f_c \simeq 1.06$.

13. The RF laser modulator of claim 11, wherein the Q of the cavity is less than the inverse of the loss tangent of the crystal modulator material.

14. The RF laser modulator of claim 11, wherein the crystal length is selected to provide microwave resonance.

15. The RF laser modulator of claim 11, wherein the crystal length, l, is approximately equal to an integral number of microwave half-wavelengths, $\lambda_m/2$, where $\lambda_m$ is the microwave wavelength in the crystal, to provide microwave resonance.

16. The RF laser modulator of claims 11 or 15, wherein the microwave dimensions are selected to provide evanescence and the waveguide is devoid of endwalls to facilitate transmitting the laser beam through the cavity.

17. The RF laser modulator of claim 16, wherein the modulating electromagnetic wave or microwave is coupled to the waveguide by one of aperture coupling to the crystal or probe coupling to the evanescent region.

18. The RF laser modulator of claim 2, wherein the crystal is LiTaO$_3$ and the waveguide width is selected such that $f/f_c$ is approximately equal to 1.06.

* * * * *